United States Patent
Reusswig et al.

(10) Patent No.: US 10,710,329 B2
(45) Date of Patent: Jul. 14, 2020

(54) HEAT PROTECTION PRODUCT

(71) Applicant: Zipper-Technik GmbH, Neu-Isenburg (DE)

(72) Inventors: Frank Reusswig, Freigericht (DE); Manfred Kirschning, Freigericht (DE); Sean Plummer, Gilbert, AZ (US)

(73) Assignee: Zipper-Technik GmbH, Neu-Isenburg (DE)

(*) Notice: Subject to any disclaimer, the term of this patent is extended or adjusted under 35 U.S.C. 154(b) by 0 days.

(21) Appl. No.: 15/112,204

(22) PCT Filed: Jan. 19, 2015

(86) PCT No.: PCT/EP2015/050880
§ 371 (c)(1),
(2) Date: Jul. 18, 2016

(87) PCT Pub. No.: WO2015/107189
PCT Pub. Date: Jul. 23, 2015

(65) Prior Publication Data
US 2016/0332420 A1 Nov. 17, 2016

(30) Foreign Application Priority Data

Jan. 17, 2014 (EP) ..................... 14151575

(51) Int. Cl.
*B32B 5/26* (2006.01)
*B32B 7/04* (2019.01)
(Continued)

(52) U.S. Cl.
CPC ............... *B32B 5/26* (2013.01); *B32B 5/026* (2013.01); *B32B 5/028* (2013.01); *B32B 7/04* (2013.01); *B60R 13/08* (2013.01); *B60R 13/0869* (2013.01); *D06M 11/83* (2013.01); *D06M 17/00* (2013.01); *D06M 17/04* (2013.01); *D06M 17/06* (2013.01); *D06M 17/10* (2013.01); *B32B 2255/02* (2013.01); *B32B 2255/205* (2013.01);
(Continued)

(58) Field of Classification Search
CPC ... Y10T 428/24033; B32B 5/26; B32B 15/14; B32B 2307/3065; B32B 7/04; B60R 13/08; B60R 13/0869; B60R 13/0876
USPC .......................................................... 428/920
See application file for complete search history.

(56) References Cited

U.S. PATENT DOCUMENTS 3,293,105 A 12/1966 Koller
3,334,006 A 8/1967 Koller
(Continued)

FOREIGN PATENT DOCUMENTS

CN 201800291 U 4/2011
CN 202271596 U 6/2012
(Continued)

OTHER PUBLICATIONS

International Search Report dated Mar. 23, 2015 (PCT/EP2015/050880).
(Continued)

*Primary Examiner* — Joanna Pleszczynska
(74) *Attorney, Agent, or Firm* — Alix, Yale & Ristas, LLP

(57) ABSTRACT

A heat protection product comprising a felt layer, which comprises polysulfone polyamide fibers, and a textile layer, which comprises inorganic fibers, said textile layer comprising a metal layer.

22 Claims, 1 Drawing Sheet

(51) Int. Cl.
*B32B 15/14* (2006.01)
*B60R 13/08* (2006.01)
*B32B 5/02* (2006.01)
*D06M 17/00* (2006.01)
*D06M 17/10* (2006.01)
*D06M 17/06* (2006.01)
*D06M 11/83* (2006.01)
*D06M 17/04* (2006.01)

(52) U.S. Cl.
CPC ... *B32B 2262/0261* (2013.01); *B32B 2262/10* (2013.01); *B32B 2262/101* (2013.01); *B32B 2262/105* (2013.01); *B32B 2262/106* (2013.01); *B32B 2307/306* (2013.01); *B32B 2605/00* (2013.01)

(56) References Cited

U.S. PATENT DOCUMENTS

| | | | | |
|---|---|---|---|---|
| 4,999,236 | A * | 3/1991 | McCullough, Jr. | B32B 27/12 442/275 |
| 7,084,083 | B2 * | 8/2006 | Anderson | B32B 7/08 442/233 |
| 8,968,439 | B2 | 3/2015 | Weilong Cai et al. | |
| 2008/0242827 | A1 | 10/2008 | Wang et al. | |
| 2011/0239618 | A1 * | 10/2011 | Hendrix | D02G 3/442 57/243 |
| 2012/0219778 | A1 * | 8/2012 | Kapaun | C04B 35/83 428/217 |
| 2012/0286177 | A1 * | 11/2012 | Cliver | D02G 3/443 250/519.1 |
| 2013/0183484 | A1 | 7/2013 | Conley et al. | |

FOREIGN PATENT DOCUMENTS

| | | |
|---|---|---|
| DE | 19720537 A1 | 11/1998 |
| DE | 19755314 A1 | 6/1999 |
| DE | 102004044057 A1 | 3/2006 |
| EP | 2185265 A2 | 5/2010 |
| EP | 1914121 B1 | 10/2013 |

OTHER PUBLICATIONS

International Preliminary Report on Patentability dated Jul. 19, 2016 (PCT/EP2015/050880).

European Search Report and Written Opinion, dated Jul. 30, 2018 (EP 161061).

* cited by examiner

HEAT PROTECTION PRODUCT

BACKGROUND

The disclosed embodiments relate to a heat protection product and to a process for producing it. Heat-shielding or heat-protecting products are employed, for example, in the motor vehicle field. These are used in order to protect temperature-sensitive components (for example, sensors, cables, flexible tubes, plugs, electronic parts) from the waste heat of other components (for example, the exhaust system). DE 197 55 314, for example, describes such a component.

DE 10 2004 044 057 describes a heat shield in the form of a heat-resistant sheet or a heat-resistant two-dimensional element.

DE 197 20 537 A1 relates to an element for trimming mounting parts, in which a metal foil is enclosed between a textile fabric and a non-woven fibrous textile.

EP 1 914 121 A2 relates to a heat protection material consisting of a textile support that is coated with a binder and covered by a metal by vapor deposition. Such materials show stabilities of up to 300° C. for 1000 h. However, the heat insulating property of corresponding products is limited.

The requirements related to corresponding heat protection products are manifold.

On the one hand, the products are supposed to have a high heat insulation, i.e., the temperature difference between the side facing the heat source and the side facing away from it should be as high as possible.

On the other hand, corresponding heat protection products must be compact, because the distances between the components become smaller and smaller in corresponding machines, for example, engines.

In addition, corresponding heat protection products must exhibit a good processability.

Finally, the cost of corresponding products are also to be considered.

It it would be useful to provide further heat protection products that meet the mentioned requirements and can exceed the prior art at least partially.

SUMMARY

A heat protection product comprises
a felt layer comprising polysulfonamide fibers
a textile layer comprising inorganic fibers
wherein said textile layer comprises a metal layer.

Thus, on the one hand, the heat protection product disclosed herein comprises a felt layer comprising polysulfonamide fibers. Polysulfonamide fibers are described, for example, in EP 1 975 285 A2.

As disclosed herein, the fibers are processed into a felt layer. Felt is a textile sheet fabric of a random fiber product that is difficult to disentangle. Various methods for preparing it are available. In particular, needling to prepare needle felts or solidification under high pressure are known. Also, materials may be woven at first and subsequently felted by fulling.

The felt layer preferably comprises at least 20% by weight, more preferably at least 50% by weight, even more preferably at least 70 or 80% by weight, of polysulfonamide fibers.

In some embodiments, other fibers, especially fibers of preoxidized polyacrylonitrile, are additionally contained.

It has been found that the thickness of the felt layer should preferably be within a range of from 1 to 10 mm.

As the density of the felt layer, densities of from 0.05 to 0.25 $g/cm^3$ are preferred.

In addition to the felt layer, the heat protection product has a textile layer. The latter comprises inorganic fibers. Preferred inorganic fibers include, in particular, glass, carbon, silicate, ceramics, aluminum silicate, basalt and mixtures thereof.

The use of glass fibers is particularly preferred.

In addition to the inorganic fibers, small amounts of organic fibers may be contained in principle. Preferably, the proportion of inorganic fibers is at least 80% by weight, preferably at least 90% by weight, of the textile layer.

Said textile layer may be a woven fabric, knitting, knitted fabric, structure or non-crimp fabric.

The bonding between the textile layer and the felt layer may occur, for example, by felting, needling, knitting, fulling, adhesive bonding, or combinations thereof. Felting both layers is particularly preferred.

In particular, silicone, polyurethane or acrylic adhesives are suitable as adhesives.

In some embodiments, an additional layer, for example, a sheet or a coating on the textile layer may be present between the textile layer and the felt layer. It may serve to reduce convection through the textile fabric and through the felt. Such sheets or coatings are preferably made of temperature-resistant polymers, especially silicone polymers.

In addition, the heat protection product comprises a metal layer at least on the side of the textile layer that is not in contact with the felt layer.

Thus, a corresponding metal layer is on the outside of the product, facing the heat source.

In one embodiment, the metal layer is applied by vapor deposition; either physical vapor deposition or chemical vapor deposition may be employed.

Preferably, the textile layer is coated with a binder before the application. Suitable binders include, in particular, EPDM, PFA, PMMA, POM, PEEK, PVA, epoxy resins, hybrid polymers, silicon compounds, especially polysiloxanes or mixtures thereof.

The applied metal layer may have a thickness within a range of about 50 to 1000 nm. It is basically sufficient if the metal layer is applied to one side, but it may also be applied to both sides of the textile layer.

While it is conceivable that the felt layer and the textile layer are bonded at first, followed by applying the metal layer by vapor deposition, it is preferred that the textile layer is first provided with a metal layer by vapor deposition, followed by bonding it with the felt layer.

Especially in this embodiment, it is helpful to provide a polymer sheet or polymer coating, especially of silicone polymers, as another layer between the textile layer and the felt layer, serving for inhibiting convections.

In another embodiment, the metal layer is not deposited by vapor deposition, but bonded to the textile layer as a metal foil. In particular, suitable metal foils are those having a thickness of from 5 to 100 μm. Preferably, the metal foil is adhesively bonded, for example, with a silicone, polyurethane or acrylic adhesive.

Although it is also possible in this case to mount the metal layer first onto the textile layer and then bond it with the felt layer, it is preferred that the felt layer and textile layer are bonded together first before the metal layer is applied. In particular, aluminum is employed as said metal. However, in principle, chromium, titanium, copper, silver, gold, silicon or combinations thereof may also be employed.

The heat protection product disclosed herein may additionally include closing components by means of which the heat protection products can be formed into a suitable shape. Suitable components include, for example, velcro fasteners and push buttons. For example, tapes, laces or threads may further be present for attachment at the sites of use. An additional adhesive equipment may also be present.

In another embodiment, for example, seams, push buttons, hooks and/or eyes may also be present in order to hold together different portions of the heat protection product.

Also disclosed is a process for preparing the heat protection product, comprising the steps:
(i)—bonding a felt layer to a textile layer, and mounting a metal layer to a textile layer, or
(ii)—mounting a metal layer to a textile layer, and bonding it to a felt layer.

Said mounting may also refer to vapor deposition.

The disclosure further relates to the use of a felt layer containing polysulfonamide fibers for preparing heat protection products.

Corresponding heat protection products are suitable, in particular, for protecting heat-sensitive components in motor vehicle construction, or for insulating exhaust systems, conducts or components.

Unexpectedly, felts containing polysulfonamide fibers can withstand temperatures that were not expected for organic materials. Thus, the structure according to the disclosure withstands heating to 300° C. for 1000 h.

DETAILED DESCRIPTION

Figure 1:
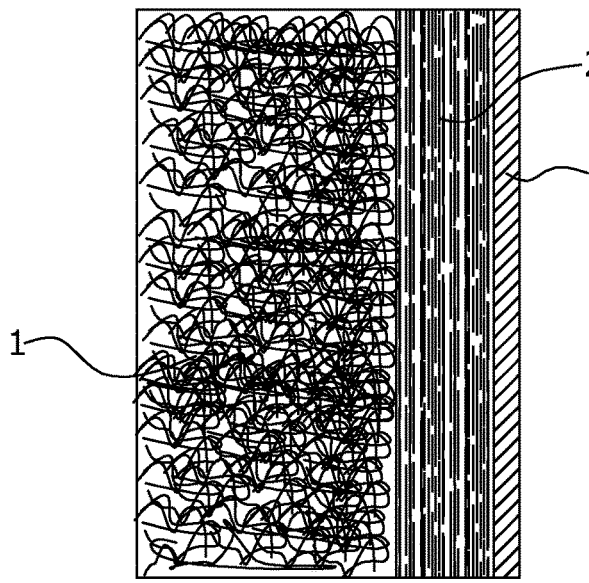
FIG. 1 shows a first embodiment of the disclosed heat protection product.

FIG. 1 shows an embodiment of the disclosed heat protection product in which a textile layer 2 is bonded on one side thereof with a felt layer 1, a metal layer 3 obtainable by vapor deposition being present on the other side.

Figure 2:
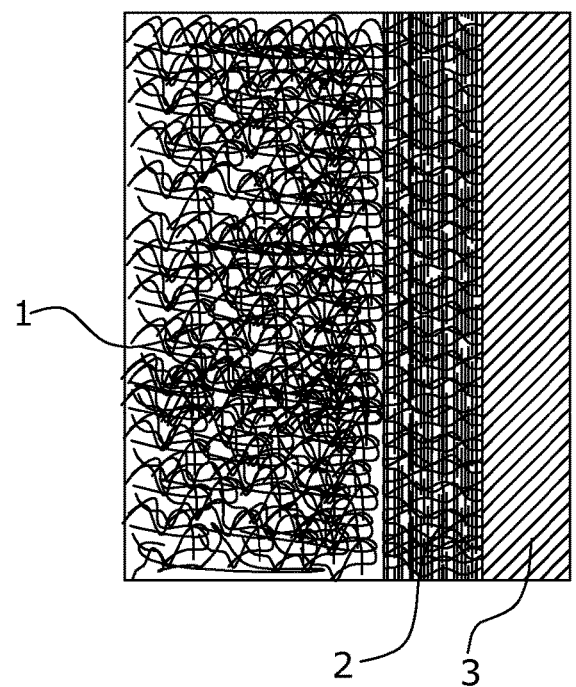
FIG. 2 shows another embodiment of the disclosed heat protection product.

FIG. 2 shows an alternate embodiment, in which a felt layer 1 and a textile layer 2 are bonded together by felting, while the latter is bonded to a metal foil 3.

Figure 3:
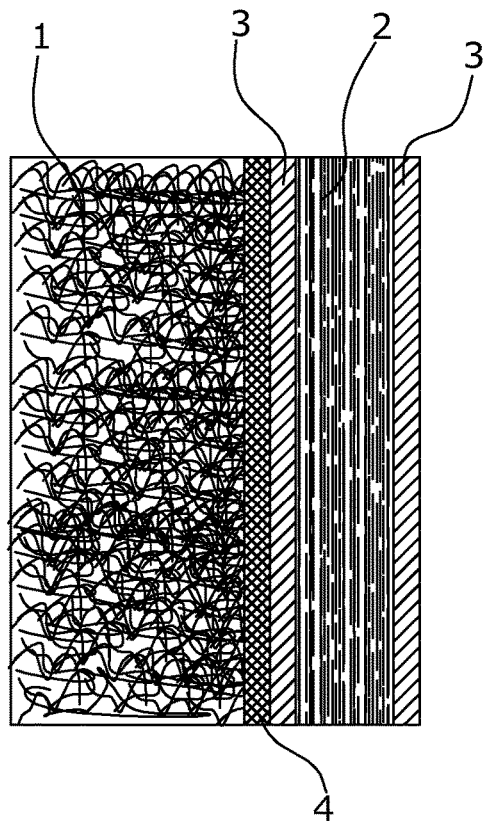
FIG. 3 shows yet another embodiment of the disclosed heat protection product.

FIG. 3 shows an embodiment with a felt layer 1 bonded to a textile layer 2, having both sides thereof provided with a metal layer 3 obtainable by vapor deposition. A polymer layer 4 is present between said felt layer and said metal layer 3.

Figure 4:
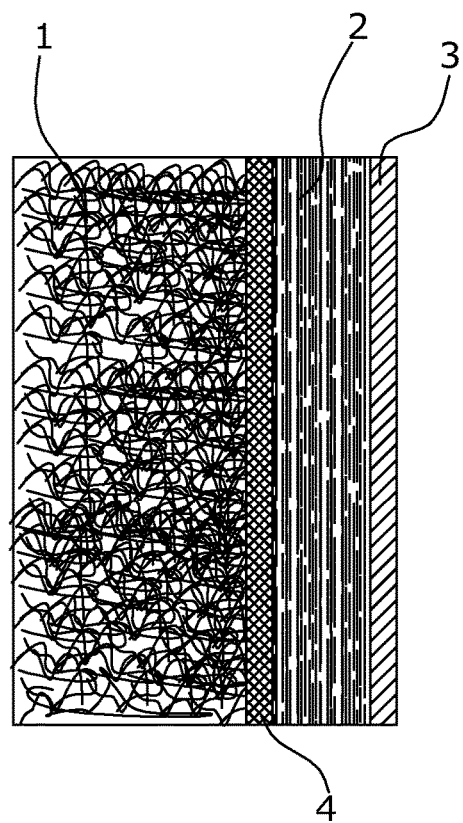
FIG. 4 shows another embodiment of the disclosed heat protection product.

FIG. 4 shows an embodiment with a felt layer 1 bonded to a textile layer 2, having one side thereof provided with a metal layer 3 obtainable by vapor deposition. A polymer layer 4 is present between said felt layer 1 and said textile layer 2.

The disclosed embodiments are further explained by the following nonlimiting Examples.

Examination Methods

Shrinkage in Thickness

The materials were exposed to temperatures of 300° C. for defined periods of time, and the thickness of the material was measured according to DIN EN ISO 5084.

Insulation Properties

The metal side of the product was heated at a defined temperature, and the temperature difference on the felt side was measured. These measurements were repeated after the product had been stored at the set temperature for 120 h.

Comparative Example 1

A heat protection product was prepared by bonding a 2.0 mm thick felt layer consisting of preoxidized polyacrylonitrile fibers to a 0.3 mm thick glass fabric layer, to which a 10 μm thick aluminum foil was adhesively bonded.

Example 2

A 2.0 mm thick felt layer containing 90% by weight of polysulfonamide fibers and 10% by weight of preoxidized polyacrylonitrile fibers was bonded to a 0.3 mm thick glass fabric layer, to which a 10 μm thick aluminum foil was adhesively bonded.

Example 3

A 1.6 mm thick felt layer containing 90% by weight of polysulfonamide and 10% by weight of preoxidized polyacrylonitrile was felted with a 0.8 mm thick glass fabric layer, followed by adhesive bonding to a 25 μm thick aluminum foil.

Comparative Example 4

To an about 0.3 mm thick glass fabric having one side thereof provided with an about 100 nm thick metal layer by vapor deposition was applied an about 0.1 mm thick silicone coating, to which an about 2.1 mm thick felt layer consisting of preoxidized polyacrylonitrile fibers was then adhesively bonded.

Example 5

To an about 0.3 mm thick glass fabric having one side thereof provided with an about 100 nm thick metal layer by vapor deposition was applied an about 0.1 mm thick silicone coating, to which an about 1.8 mm thick felt layer consisting of 90% polysulfonamide fibers and 10% preoxidized polyacrylonitrile fibers was then adhesively bonded.

Results

Tables 1 and 2 show measured values of the Examples.

As could be expected, it is found that the insulation properties increase as the aluminum or felt layer becomes thicker, depending on the material structure. However, it is also found that felts without polysulfonamide fibers cannot cope with the temperature loads over an extended period of time, but both lose in thickness and significantly reduce their insulating properties.

All quoted documents are included in this disclosure by reference to the full extent thereof, unless such disclosure would be in contradiction to the teaching of the invention.

TABLE 1

|  |  | Comparative Example 1 |  | Example 2 |  | Example 3 |  |
|---|---|---|---|---|---|---|---|
| 300° C. | Material thickness |  | Loss of thickness (total) |  | Loss of thickness (total) |  | Loss of thickness (total) |
|  | after 0 h | 2.35 |  | 2.36 |  | 2.40 |  |
|  | after 45 h | 2.18 | 7% | 2.36 | 0% | 2.40 | 0% |
|  | after 120 h | 2.09 | 11% | 2.29 | 3% | 2.33 | 3% |
| 200° C. | Insulating properties | To − Tu (Kelvin) | Insulation reduction | To − Tu (Kelvin) | Insulation reduction | To − Tu (Kelvin) | Insulation reduction |
|  | after 0 h | 75 |  | 75 | 0% | 87 |  |
|  | after 120 h | 55 | 27% | 73 | 3% | 86 | 1% |
| 250° C. | Insulating properties | To − Tu (Kelvin) | Insulation reduction | To − Tu (Kelvin) | Insulation reduction | To − Tu (Kelvin) | Insulation reduction |
|  | after 0 h | 86 |  | 87 |  | 108 |  |
|  | after 120 h | 69 | 20% | 87 | 0% | 107 | 1% |
| 300° C. | Insulating properties | To − Tu (Kelvin) | Insulation reduction | To − Tu (Kelvin) | Insulation reduction | To − Tu (Kelvin) | Insulation reduction |
|  | after 0 h | 100 |  | 100 |  | 127 |  |
|  | after 120 h | 83 | 17% | 100 | 0% | 127 | 0% |

TABLE 2

|  |  | Comparative Example 4 |  | Example 5 |  |
|---|---|---|---|---|---|
|  | Material thickness |  | Loss of thickness (total) |  | Loss of thickness (total) |
| 300° C. | after 0 h | 2.57 |  | 2.16 |  |
|  | after 45 h | 2.43 | 6% | 2.14 | 1% |
|  | after 120 h | 2.24 | 13% | 2.17 | 0% |
|  | Insulating properties | To-Tu (Kelvin) | Insulation reduction | To-Tu (Kelvin) | Insulation reduction |
| 200° C. | after 0 h | 76 |  | 76 |  |
|  | after 120 h | 73 | 4% | 75 | 1% |
| 250° C. | after 0 h | 95 |  | 93 |  |
|  | after 120 h | 81 | 15% | 92 | 1% |
| 300° C. | after 0 h | 111 |  | 112 |  |
|  | after 120 h | 97 | 13% | 109 | 3% |

To = surface temperature on metal side (hot side)
Tu = surface temperature on felt side (cold side)
To-Tu = difference of surface temperatures

The invention claimed is:

1. A heat protection product comprising
a felt layer comprising polysulfonamide fibers having a felt layer first side and a felt layer second side; and
a textile layer comprising inorganic fibers having a first side connected to the felt layer second side, and an opposite second side, wherein
said textile layer is bonded to a metal layer on at least the second side that is not in contact with the felt layer,
the felt layer first side is an outer layer of the heat protection product, and wherein
the felt layer first side defines a cold side (Tu) and an opposite outer side of the product defines a hot side (To),
the product exhibits 25% or less of the loss of insulating properties of a comparative product with layers of felt and textile respectively having the same or greater thickness as the respective felt layer and textile layer of the heat protection product but with the polysulfonamide fibers replaced with non-polysulfonamide fibers when exposed to the same temperature between 200° C. and 300° C. on the hot side (To) for the same duration, and
the reduction in insulation is measured by a change in the difference between a measured surface temperature at the hot side (To) and a measured surface temperature at the cold side (Tu).

2. The heat protection product of claim 1, wherein the heat protection product withstands heating to 300° C. for 1000 hours.

3. The heat protection product according to claim 1, wherein said felt layer comprises at least 50% by weight of polysulfonamide fibers.

4. The heat protection product according to claim 1, wherein said felt layer additionally comprises preoxidized polyacrylonitrile fibers.

5. The heat protection product according to claim 1, wherein said felt layer has a thickness of from 1 to 10 mm.

6. The heat protection product according to claim 1, comprising a polymer layer positioned between the felt layer and the textile layer.

7. The heat protection product according to claim 1, wherein said inorganic fibers of the textile layer are selected from the group consisting of glass, carbon, silicate, ceramics, aluminum silicate, basalt and mixtures thereof.

8. The heat protection product according to claim 1, wherein said textile layer is a woven or knitted fabric, structure or non-crimp fabric.

9. The heat protection product according to claim 1, wherein said felt layer and said textile layer are bonded together by felting, needling, knitting, fulling, adhesive bonding, or combinations thereof.

10. The heat protection product according to claim 1, wherein said metal layer is applied to said textile layer by vapor deposition.

11. The heat protection product according to claim 10, wherein said textile layer is coated with a binder before the metal layer is applied.

12. The heat protection product according to claim 11, wherein said binder is selected from the group consisting of EPDM, PFA, PMMA, POM, PEEK, PVA, epoxy resins, hybrid polymers and silicon compounds.

13. The heat protection product according to claim 1, wherein said metal layer is adhesively bonded to said textile layer.

14. The heat protection product according to claim 13, wherein said metal layer is selected from aluminum, chromium, titanium, copper, silver, gold, silicon or combinations thereof.

15. The heat protection product according to claim 1, wherein said felt layer has a density of from 0.05 to 0.25 g/cm$^3$.

16. The heat protection according to claim 6, wherein the polymer layer is a polymer sheet or polymer coating.

17. The heat protection product of claim 12, wherein the silicon compound is a polysiloxane.

18. The heat protection product of claim 1, wherein the metal layer has a layer thickness of from 5 to 100 µm.

19. A heat protection product comprising
   a felt layer comprising polysulfonamide fibers having a felt layer first side and a felt layer second side; and
   a textile layer comprising inorganic fibers having a first side connected to the felt layer second side, and an opposite second side, wherein
   said textile layer is bonded to a metal layer on at least the second side that is not in contact with the felt layer,
   the felt layer first side is an outer layer of the heat protection product,
   the felt layer first side defines a cold side (Tu) and an opposite outer side of the product defines a hot side (To),
   the product has an initial thickness, and
   after exposure on the hot side (To) to a temperature of 300° C. for 120 hours, the product experiences a loss of thickness of less than 4%.

20. The heat protection product according to claim 19, wherein
   the product retains insulating properties such that a reduction in insulation as measured by a change in the difference between a measured surface temperature at the hot side (To) and a measured surface temperature at the cold side (Tu) is less than 4% after exposure on the hot side (To) to temperature of 300° C. for 120 hours.

21. The heat protection product according to claim 19, wherein said felt layer additionally comprises preoxidized polyacrylonitrile fibers.

22. A heat protection product comprising
   a felt layer comprising polysulfonamide fibers having a felt layer first side and a felt layer second side; and
   a textile layer comprising inorganic fibers having a first side connected to the felt layer second side, and an opposite second side, wherein
   said textile layer is bonded to a metal layer on at least the second side that is not in contact with the felt layer,
   the felt layer first side is an outer layer of the heat protection product,
   the felt layer first side defines a cold side (Tu) and an opposite outer side of the product defines a hot side (To), and
   the product retains insulating properties such that a reduction in insulation as measured by a change in the difference between a measured surface temperature at the hot side (To) and a measured surface temperature at the cold side (Tu) is less than 4% after exposure on the hot side (To) to temperature of 300° C. for 120 hours.

\* \* \* \* \*